(12) United States Patent
Wu

(10) Patent No.: US 6,495,066 B1
(45) Date of Patent: Dec. 17, 2002

(54) DOPANTS FOR IMPROVING THE THERMAL AND UV STABILITY OF HIGH BIREFRINGENCE LIQUID CRYSTALS

(75) Inventor: Shin-Tson Wu, Northridge, CA (US)

(73) Assignee: Raytheon Company, Lexington, MA (US)

( * ) Notice: Subject to any disclaimer, the term of this patent is extended or adjusted under 35 U.S.C. 154(b) by 128 days.

(21) Appl. No.: 09/614,443

(22) Filed: Jul. 12, 2000

(51) Int. Cl.[7] .................. C09K 19/58; C09K 19/42
(52) U.S. Cl. .................. 252/299.2; 252/299.5
(58) Field of Search .................. 252/299.01, 299.05, 252/299.2; 428/1.1

(56) References Cited

U.S. PATENT DOCUMENTS

| | | | |
|---|---|---|---|
| 4,603,187 A | * 7/1986 | Choe | 526/285 |
| 5,338,481 A | 8/1994 | Wu et al. | 252/299.01 |

OTHER PUBLICATIONS

CAPLUS 1994: 468761.*
S.T. Wu et al, "High Solubility and Low Viscosity Dyes for Guest–Host Displays", Proceedings of the Fifteenth International Display Research Conference, Asia Display '95, pp. 567–570.
Y. Goto et al, "New Nematics with High Birefringence#", Mol. Cryst. Liq. Cryst. vol. 260, pp. 23–38, (1995).
Shin–Tson Wu et al, "High Birefringence and Wide Nematic Range Bis–Tolane Liquid Crystals", Applied Physics Letters, vol. 74, No. 3, pp. 344–346 (Jan. 18, 1999).
Shin–Tson Wu et al, "Room Temperture Bis–tolane Liquid Crystals", Jpn. J. Appl. Phys. , vol. 38, pp. 286–288, (1999).
Shin–Tson Wu et al, "Physical Properties of Polar Bis–Tolane Liquid Crystals", Jpn. J. Appl. Phys. vol. 39, pp. L38–41, (2000).

* cited by examiner

*Primary Examiner*—Shean C. Wu
(74) *Attorney, Agent, or Firm*—Daly, Crowley & Mofford, LLP

(57) ABSTRACT

Specific dopants are provided that protect high birefringence liquid crystals from UV and thermal degradation. These dopants are called "amino-tolane" compounds and have a structure given by:

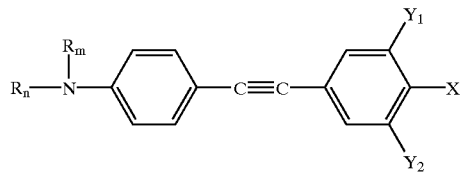

where $R_m$ and $R_n$ are each independently an alkyl group or an alkoxy group having from 1 to 12 carbon atoms or an alkenyl group or an alkenyloxy group having from 2 to 12 carbon atoms, X is selected from the group consisting of $NO_2$, CN, NCS, F, $CF_3$, and $OCF_3$, and $Y_1$ and $Y_2$ are each independently H or F. The advantages of the use of the amino-tolanes are numerous, including the fact that a simple process is used to form them, they are low cost, they maintain high birefringence and large dielectric anisotropy of the liquid crystal, and the viscosity of the mixture of the dopants with the liquid crystal is low.

13 Claims, 3 Drawing Sheets

DOPANTS FOR IMPROVING THE THERMAL AND UV STABILITY OF HIGH BIREFRINGENCE LIQUID CRYSTALS

TECHNICAL FIELD

The present invention is directed generally to liquid crystals, and, more particularly, to dopants for improving the thermal and ultraviolet (UV) stability of high birefringence liquid crystals.

BACKGROUND ART

High birefringence (high Δn) liquid crystals (LCs) are very attractive for agile laser beam steering in the infrared region and reflective displays employing cholesteric LCs. The liquid crystal material is contained between two glass substrates, called a cell. During cell fabrication, ultraviolet (UV) light is commonly used to cure the glue lines securing the two glass substrates together and to plug the hole that is left for vacuum-filling LC materials. The device may be operated at elevated temperature in order to obtain fast response time. Thus, good UV and thermal stability is an absolute requirement for a LC device to ensure long term operation.

The birefringence of a liquid crystal is determined by the molecular conjugation. As the molecular conjugation gets longer, the electronic absorption edge shifts from deep UV to blue spectral region. During UV exposure, these chemical bonds may be disintegrated. Due to the skin depth effect, the surface layers will be decomposed first. These decomposed boundary layers will disturb the bulk alignment and deteriorate the electro-optic properties of the cell.

Two known UV inhibitors, 4-methoxyphenol and 2-(2H-benzotriazol-2-yl)-4-(1,1,3,3-tetramethylbutyl)-phenol, available from Aldrich Chemical, have been added to high birefringent liquid crystals. Surprisingly, they were found to help improve the thermal stability of the liquid crystal, but did not protect the liquid crystal compound from the effects of UV exposure.

Specifically, 4-methoxyphenol, which has the structure shown below, was added to a liquid crystal mixture:

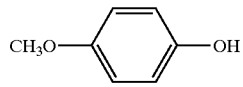

At a concentration of 1 to 2 wt %, a noticeable improvement on thermal stability was observed. However, this additive made no contribution to UV stability at all.

Another longer conjugated chemical, 2-(2H-benzotriazol-2-yl)-4-(1,1,3,3-tetra-methylbutyl)phenol, was also tried. Again, no improvement on UV stability was detected. This compound is so bulky that adding 2 wt % to PTTP-24/36 caused the viscosity to increase about 10%, which reduced the response of the liquid crystal cell. (The PTTP-24/36 liquid crystal mixture is described in greater detail below).

Thus, there is a need for preventing disruption of chemical bonds in liquid crystal molecules as a result of UV exposure.

DISCLOSURE OF INVENTION

In accordance with the present invention, specific dopants are provided that protect high birefringence liquid crystals from UV and thermal degradation. These dopants are called "amino-tolane" compounds and have a structure given by:

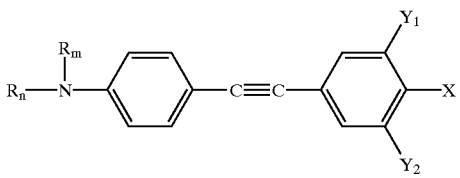

where $R_m$ and $R_n$ are each independently an alkyl group or an alkoxy group having from 1 to 12 carbon atoms or an alkenyl group or an alkenyloxy group having from 2 to 12 carbon atoms, X is selected from the group consisting of $NO_2$, CN, NCS, F, $CF_3$, and $OCF_3$, and $Y_1$ and $Y2$ are each independently H or F. The concentration range of the dopant in the liquid crystal is about 1 to 20 wt %.

The advantages of the use of the nitro-amino-tolanes are numerous, including their low cost, their birefringince is as large as 0.4, their dielectric anisotropy (Δ∈) exceeds 50, and the viscosity of the mixture of the dopants with the liquid crystal is low.

BEST MODES FOR CARRYING OUT THE INVENTION

Reference is now made in detail to a specific embodiment of the present invention, which illustrates the best mode presently contemplated by the inventor for practicing the invention. Alternative embodiments are also briefly described as applicable.

A new use of amino-tolane compounds has been found that can protect high birefringence liquid crystals from UV and thermal degradation. By "high birefringence" is meant a Δn greater than 0.25. The higher the birefringence, the lower the UV and thermal stability of the liquid crystal material. The following class of aminotolane compounds not only provides UV and thermal stability but also reduces the threshold voltage:

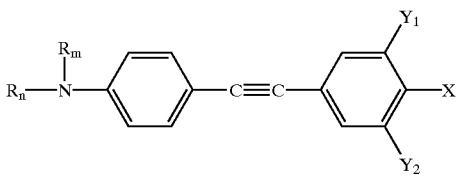

where $R_m$ and $R_n$ are each independently an alkyl group $(C_nH_{2n-1})$ or an alkoxy group $(OC_nH_{2n+1})$ having from 1 to 12 carbon atoms, or an alkenyl group $(C_nH_{2n-1})$ or alkenyloxy group $(OC_nH_{2n-1})$ having from 2 to 12 carbon atoms, X is selected from the group consisting of $NO_2$, CN, NCS, F, $CF_3$, and $OCF_3$, and $Y_1$ and $Y_2$ are each independently H or F.

Figure 3:
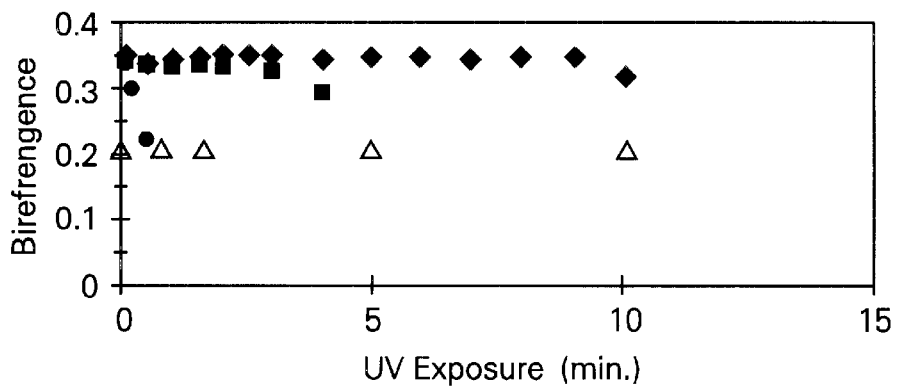
FIG. 3, on coordinates of birefringence and time (minutes), depicts the UV stability of four liquid crystal mixtures: (1) filled circles (●)—PTTP-24/36; (2) filled squares (■)—PTTP-24/36+5% C5 nitro-amino-tolane ($R_n$=$C_5H_{11}$, $R_m$=H, $Y_1$=$Y_2$=H, X=$NO_2$); (3) filled diamonds (♦)—PTTP-24/36+10% C5 nitro-amino-tolane; and (4) open triangles (Δ)—E63.

The compounds with $R_n=C_4-C_7$ (i.e., $C_4H_9$ to $C_7H_{15}$), $R_m$=H, $Y_1$=$Y_2$=H, and X=$NO_2$ were previously developed and first reported by S. T. Wu et al, *Proceedings of Asia Display*, p. 567 (Hamamatsu, Japan, 1995). The purpose at that time was to reduce the operating voltage of the PTTP-24/36 mixture, due to its huge dipole moment. However, at that time, it was not expected that this compound could provide UV and thermal stability of the high An liquid crystal materials. Results on the UV aging of PTTP-24/36 and a commercial E63 mixture are shown in FIG. 3 for comparison.

It will be appreciated by those skilled in this art that where X is —$NO_2$, the compounds, called "nitro-amino-tolanes", are orange in color. Where X is —CN, —NCS, —F, —$CF_3$ and —$OCF_3$, the resulting compounds are colorless. Selection of a particular X will be dictated by the expected application of the liquid crystal material.

The concentration of the amino-tolane dopant in the liquid crystal material is in the range of 1 to 20 wt %, preferably 5 to 10 wt %.

Without the amino-tolane dopant, the diphenyl-diacetylene liquid crystals can only withstand 10 seconds of UV exposure (at 100 mW/cm² intensity). Adding 5 and 10% of a nitro-amino-tolane, for example, to diphenyl-diacetylene liquid crystals improves the UV stability to 3 and 8 minutes, respectively. Moreover, the 10% mixture also greatly improves the thermal stability. This compound can be used to protect other high birefringence liquid crystal materials as well, as discussed below.

Figure 4:
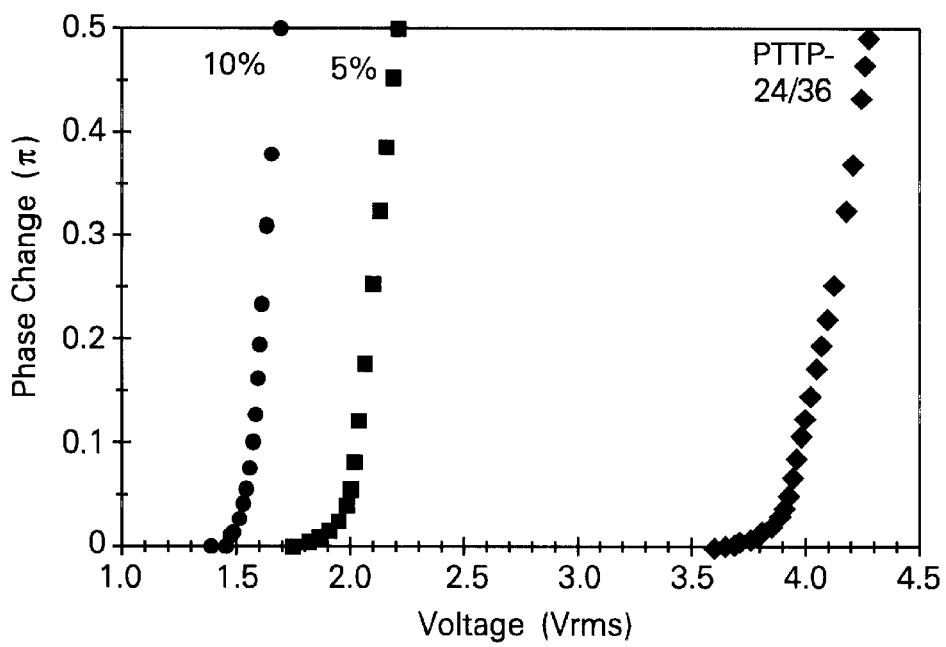
FIG. 4, on coordinates of phase change (π) and voltage ($V_{rms}$), is a plot depicting the concentration effect of a nitro-amino-tolane compound on the threshold voltage of PTTP-24/36.

The compounds of the present invention not only help to provide thermal and UV stability, but also lower the operating voltage, as shown in FIG. 4. (Low voltage operation is desirable as it will lower the cost of the driving electronics.)

Diphenyl-diacetylene liquid crystals are known to exhibit a high birefringence, low viscosity, wide nematic range, and small heat fusion enthalpy. They have been used extensively in optical phased arrays. The structure of a diphenyl-diacetylene liquid crystal is shown below.

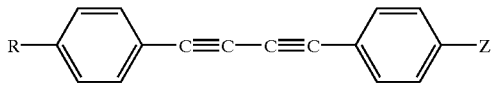

where R is an alkyl, alkoxy, alkenyl, or alkenyloxy group having from 1 to 12 carbon atoms and Z is either an alkyl, alkoxy, alkenyl, or alkenoxy group having from 1 to 12 carbon atoms or a polar group, such as F or CN; see, S. T. Wu et al, U.S. Pat. No. 5,338,481, entitled "Asymmetrical Nonpolar Diphenyl-Diacetylene Liquid Crystal Eutectic Mixtures" and issued Aug. 16, 1994.

Figure 1:
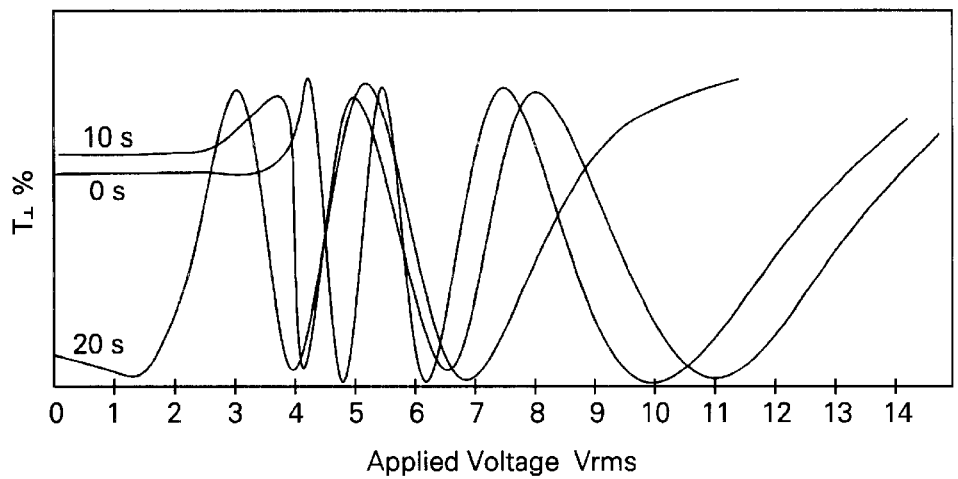
FIG. 1, on coordinates of transmission (percent) and applied voltage $V_{rms}$ (volts), is a plot depicting the voltage-dependent light transmittance of a 7-μm homogeneous liquid crystal cell under UV exposure: 0, 10 and 20 seconds, λ=633 nm, T=22° C.

These compounds are commonly abbreviated as PTTP-nm, where "PTTP" is an abbreviation for phenyl-triple bond-triple bond-phenyl and n and m are the number of carbon atoms where the R and Z groups are alkyls. A binary mixture has been formulated using PTTP-24 and PTTP-36 at 1:1 ratio ("PTTP-24/36") and its UV and thermal stability have been studied. A 7-μm homogeneous cell was prepared for the UV stability test. Such cells are well-known in the liquid crystal art. The results are shown in FIG. 1.

Additional liquid crystal compounds having a high birefringence that are suitably employed in the practice of the present invention include

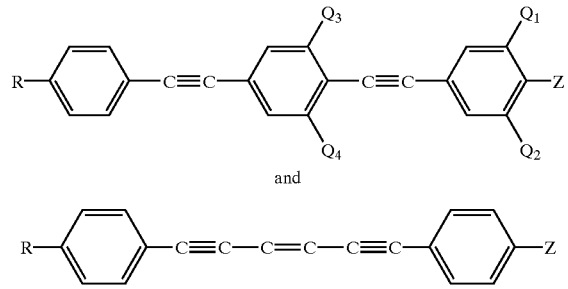

where R and Z are as defined above and where $Q_1$, $Q_2$, $Q_3$, and $Q_4$ are each independently H, F, $CH_3$ or $C_2H_5$.

FIG. 1 shows the voltage-dependent transmittance of the 7-μm liquid crystal cell at λ=633 nm and T=22° C. Before UV irradiation, there is a clear threshold voltage at $V_{th}$~3.7 $V_{rms}$ and the total phase retardation δ=2πdΔn/λ is 7.38π radians. After 10 seconds of UV exposure at ~100 mW/cm² intensity, the threshold behavior is smeared and the total phase retardation is reduced to 7.3π radians. At 20 seconds of exposure, the threshold is completely destroyed and the available phase is reduced to about 6π radians. The smearing threshold implies that the pretilt angle is substantially increased. As is well-known, the change of pretilt angle depends on the UV exposure levels. Any non-uniformity of the UV light could result in a spatially varying pretilt angle. Therefore, the phase change of the liquid crystal phase arrays would be very non-uniform. Non-uniform surface layers gradually migrate into the bulk, resulting in decreased phase retardation.

In another high An liquid crystal compound, designated PTP(3-Et)TP-53 (the structure is shown below), the undoped PTP(3-Et)TP liquid crystals could only withstand 1 minute of UV exposure (at 100 mW/cm² intensity). Adding 5 wt % or 10 wt % of a nitro-amino-tolane, for example, to this liquid crystal material improved the UV stability to 10 minutes.

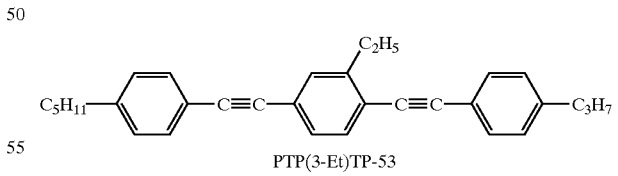

PTP(3-Et)TP-53

Figure 2:
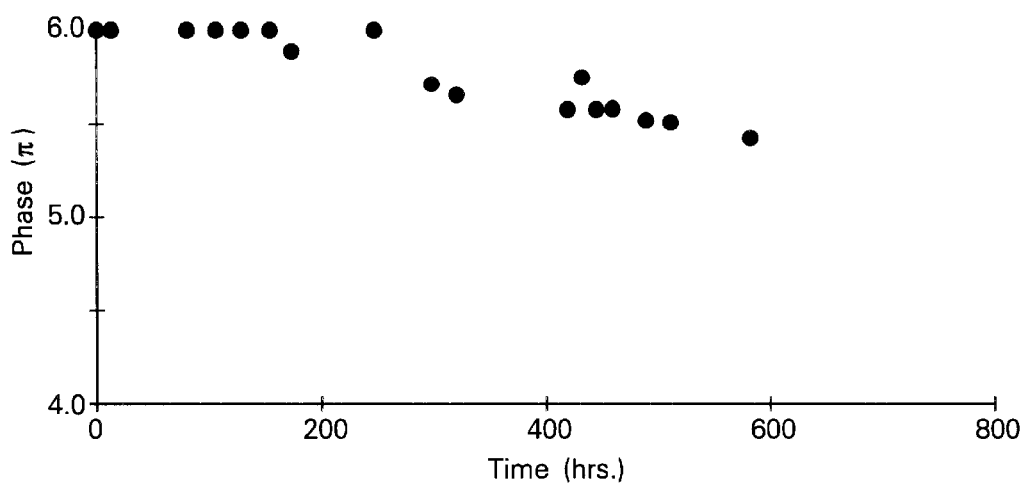
FIG. 2, on coordinates of phase (π) and time (hours), is a plot depicting the thermal aging effect of PTTP-24/36 at T=60° C.

FIG. 2 shows the thermal aging effect of the PTTP-24/36 mixture. The liquid crystal cell was mounted on a heating plate with temperature controlled at 60° C. The total phase retardation of the cell was measured at T=60° C. After ~300 hours, the phase retardation started to decrease. In the meantime, it was observed that the viscoelastic coefficient $\gamma_1/K_{11}$ gradually increased as Δn decreased. As the storage temperature increased to 80° C., the degradation occured faster. Some free radicals could have been formed and tangled so that the response time became slower.

FIG. 3 shows the UV stability of a binary PTTP-24/36 mixture with and without the C5 nitro-amino-tolane dopant ($R_n=C_5H_{11}$). The undoped PTTP-24/36 (filled circles) could only withstand 10 seconds of UV irradiation (at I~100 mW/cm$^2$). After that, the birefringence dropped significantly and threshold voltage disappeared completely, as depicted in FIG. 1. This indicates that UV-induced decomposition first takes place at the surface layers and then disturbs the bulk molecular alignment. With the addition of 5 wt % and 10 wt % nitro-amino-tolane (filled squares and filled diamonds, respectively), the UV stability was improved to 3 minutes and 9 minutes, respectively. Also included in FIG. 3 for comparison is a commercial E63 mixture (open diamonds) consisting of mainly cyano-biphenyl compounds, available from Merck & Co., Inc. The cyano-biphenyl compound has a shorter conjugation than PTTP, thus, its UV stability is expected to be better except its Δn is much lower than that of PTTP. After 10 minutes of exposure, the threshold voltage $V_{th}$ of E63 was gradually smeared, although the decrease of birefringence remained small.

The thermal stability of doped mixtures was also evaluated. The PTTP-24/36 mixture doped with 10 wt % nitro-amino-tolane showed no degradation at 85° C. for more than 500 hours. Without the dopant, the PTTP-24/36 host started to degrade in about a day.

The nitro-amino-tolane dopant not only enhanced the photo and thermal stability but also reduced the threshold voltage of PTTP-24/36, as shown in FIG. 4. As the dopant concentration increased from 0% (filled diamonds) to 5% (filled squares) to 10% (filled circles), the threshold voltage dropped from 3.8 $V_{rms}$ to 1.8 $V_{rms}$ to 1.4 $V_{rms}$, respectively. Owing to the push-pull effect between the nitro and amino groups, the dielectric anisotropy of nitro-amino-tolane is estimated to be ~60. The viscosity of the nitro-amino-tolane is about the same as the PTTP host. Thus, adding 10% dopant does not affect the mixture's viscosity noticeably.

Another advantage of the nitro-amino-tolane compounds is that their birefringence (Δn) is as large as the host PTTP-24/36. Adding 10 wt % of the C5 compound (X=—NO$_2$, $R_n=C_5H_{11}$) to PTTP-24/36 does not decrease its birefringence. Moreover, the mixture's melting point drops from 13° to 7.5° C., indicating that the guest and host compounds form a good eutectic mixture. The melting point of nitro-amino-tolane is 98.3° C. and heat fusion enthalpy is 4.7 kcal/mol. It will be appreciated by those skilled in this art that solubility of the nitro-amino-tolane compounds in the liquid crystal material is affected by melting point and heat fusion enthalpy, which depends on the number of carbon atoms in $R_n$ and $R_m$. In this connection, the compound with $R_n=C_5H_{11}$ and $R_m=H$ has been found to be the best, so far.

Figure 5:
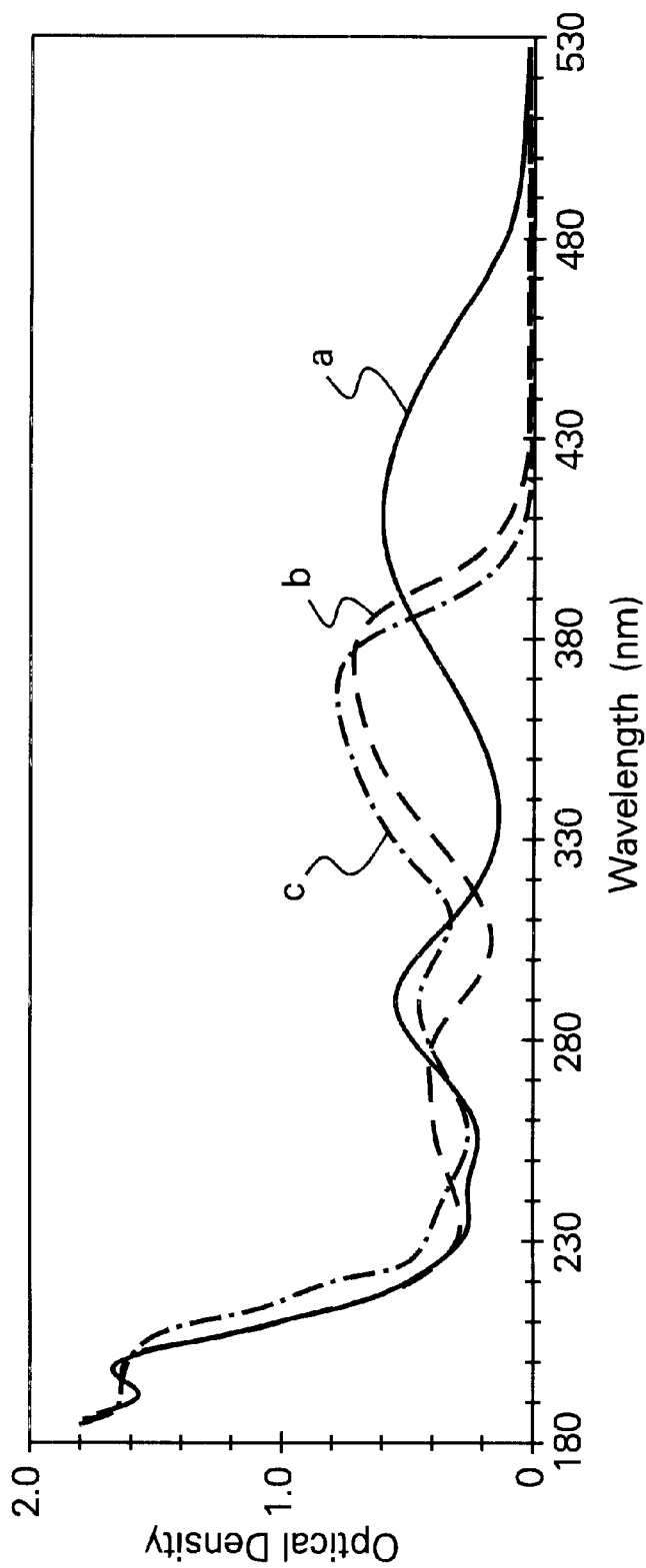
FIG. 5, on coordinates of optical density and wavelength, is a plot of the absorption spectra of three dopants, where $R_n$=$C_5H_{11}$, $R_m$=H, $Y_1$=$Y_2$=H, and X=$NO_2$ (a), CN (b), and NCS (c).

Different nitro-amino-tolane homologues (n=4, 6, and 7) have also been studied. The results are similar. These tolanes are actually dyes. Their absorption peak appears at 410 nm. For IR applications, the orange color is not a problem because the absorption tail does not extend that far. On the other hand, for visible applications, the compounds with X=—CN or —NCS may be preferred. FIG. 5 depicts the absorption spectra of three compounds, all with $R_n=C_5H_{11}$, $R_m=H$, and $Y_1=Y_2=H$. Curve (a) denotes the compound with X=NO$_2$, curve (b) denotes the compound with X=CN, and curve (c) denotes the compound with X=NCS.

While the nitro-amino-tolane compounds are known, the compounds with X=—CN, —NCS, —F, —CF$_3$, and —OCF$_3$ are believed to be novel. The melting points (m.p.) and heats of enthalpy (ΔH) of some of these amino-tolanes were measured. The results are listed in the Table below.

TABLE

Melting Points and Heats of Enthalpy for Certain Amino-Tolanes.

| $R_n$ | $R_m$ | $Y_1$ | $Y_2$ | X | m.p., ° C. | ΔH, kcal/mole |
|---|---|---|---|---|---|---|
| $C_5H_{11}$ | H | H | H | —CN | 133.6 | 10.7 |
| $C_5H_{11}$ | H | H | H | —NCS | 123.5 | 5.96 |

The amino-tolanes of the present invention may find application in a wide range of technologies:

1. laser beam steering using liquid crystal optical phased arrays;
2. millimeter-wave scanning antennae;
3. commercial laser communication systems using high birefringent liquid crystals; and
4. high birefringent liquid crystals for flat panel displays.

INDUSTRIAL APPLICABILITY

The amino-tolanes of the present invention are expected to find use in providing thermal and UV stability in liquid crystals, particularly high birefringence liquid crystals.

What is claimed is:

1. A method for improving ultraviolet and thermal stability of liquid crystal compounds, said method comprising adding an effective amount of an amino-tolane to form a mixture with said liquid crystal compounds and thereby increase said stability of said liquid crystal compounds to ultaviolet radiation and thermal effects.

2. The method of claim 1 wherein said amino-tolane is given by the formula

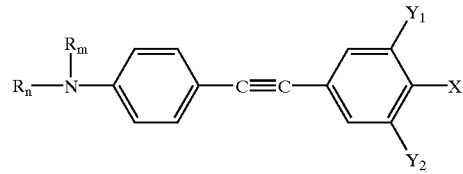

where $R_m$ and $R_n$ are each independently selected from the group consisting of an alkyl group or an alkoxy group having from 1 to 12 carbon atoms or an alkenyl group or an alkenyloxy group having from 2 to 12 carbon atoms, X is selected from the group consisting of NO$_2$, CN, NCS, F, CF$_3$, and OCF$_3$, and $Y_1$ and $Y_2$ are each independently H or F.

3. The method of claim 2 wherein $R_n=C_5H_{11}$, $R_m=H$, $Y_1=Y_2=H$, and X=NO$_2$.

4. The method of claim 1 wherein said effective amount is within the range of 1 to 20 wt % of said liquid crystal compounds.

5. The method of claim 4 wherein said effective amount is within the range of 5 to 10 wt %.

6. The method of claim 1 wherein said liquid crystal compounds are selected from the group consisting of

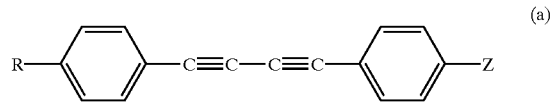

(a)

-continued

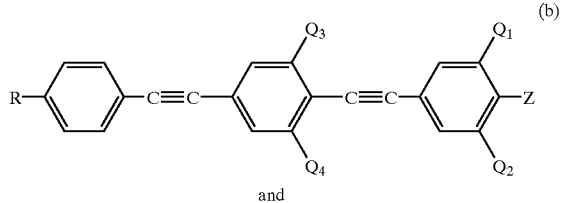
(b)

and

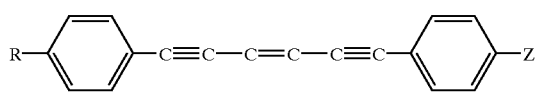
(c)

where R is an alkyl group or an alkoxy group having from 1 to 12 carbon atoms or an alkenyl group or alkenyloxy group having from 2 to 12 carbon atoms, Z is either an alkyl group or an alkoxy group having from 1 to 12 carbon atoms or an alkenyl group or an alkenoxy group having from 2 to 12 carbon atoms or a polar group, and $Q_1$, $Q_2$, $Q_3$, and $Q_4$ are each independently H, F, $CH_3$ or $C_2H_5$.

7. A mixture comprising dopants for improving ultraviolet and thermal stability of liquid crystal compounds, said dopants comprising amino-tolanes having the structure

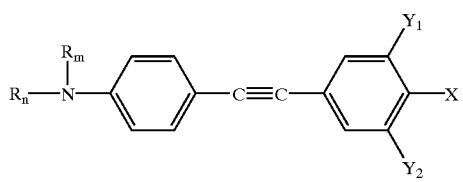

where $R_m$ and $R_n$ are independently an alkyl group or an alkoxy group having from 1 to 12 carbon atoms or an alkenyl group or an alkenyloxy group having from 2 to 12 carbon atoms, X is selected from the group consisting of CN, NCS, F, $CF_3$, and $OCF_3$, and $Y_1$ and $Y_2$ are each independently H or F; and wherein said liquid crystal compounds are selected from the group consisting of

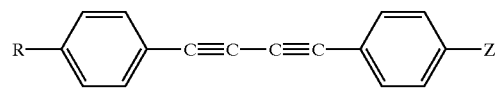
(a)

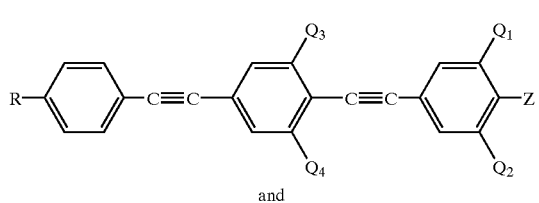
(b)

and

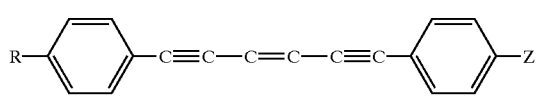
(c)

where R is an alkyl group or an alkoxy group having from 1 to 12 carbon atoms or an alkenyl group or alkenyloxy group having from 2 to 12 carbon atoms, Z is either an alkyl group or an alkoxy group having from 1 to 12 carbon atoms or an alkenyl group or an alkenoxy group having from 2 to 12 carbon atoms or a polar group, and $Q_1$, $Q_2$, $Q_3$, and Q4 are each independently H, F, $CH_3$ or $C_2H_5$.

8. Dopants for improving ultraviolet and thermal stability of liquid crystal compounds, said dopants comprising amino-tolanes having the structure

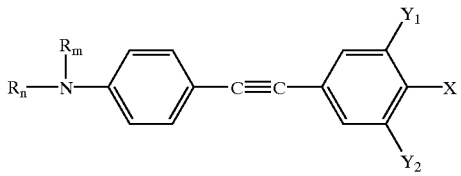

where $R_m$ and $R_n$ are independently an alkyl group or an alkoxy group having from 1 to 12 carbon atoms or an alkenyl group or an alkenyloxy group having from 2 to 12 carbon atoms, X is selected from the group consisting of CN, NCS, F, $CF_3$, and $OCF_3$, and $Y_1$ and $Y_2$ are each independently H or F.

9. A mixture of liquid crystal compounds and dopants for improving ultraviolet and thermal stability of said liquid crystal compounds, said mixture comprising at least one liquid crystal compound having a birefringence of at least 0.25 and at least one dopant consisting essentially of an amino-tolane having the structure

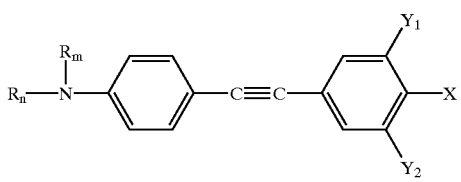

where $R_m$ and $R_n$ are each independently an alkyl group or an alkoxy group having from 1 to 12 carbon atoms or an alkenyl group or an alkenyloxy group having from 2 to 12 carbon atoms, X is selected from the group consisting of CN, NCS, F, $CF_3$, and $OCF_3$, and $Y_1$ and $Y_2$ are each independently H or F.

10. The mixture of claim 9 wherein said liquid crystal compounds are selected from the group consisting of

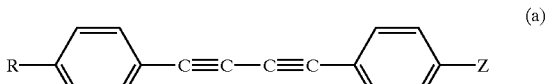
(a)

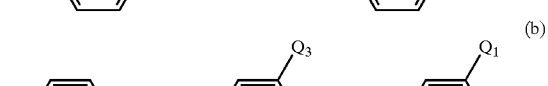
(b)

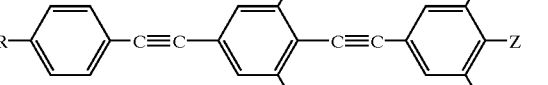

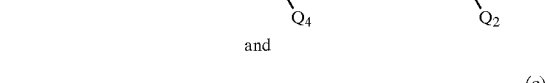
and

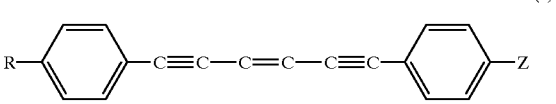
(c)

where R is an alkyl group or an alkoxy group having from 1 to 12 carbon atoms or an alkenyl group or alkenyloxy group having from 2 to 12 carbon atoms, Z is either an alkyl group or an alkoxy group having from 1 to 12 carbon atoms or an alkenyl group or an alkenoxy group having from 2 to 12 carbon atoms or a polar group, and $Q_1$, $Q_2$, $Q_3$, and $Q_4$ are each independently H, F, $CH_3$ or $C_2H_5$.

11. The mixture of claim 9 where X is selected from the group consisting of CN and NCS.

12. The mixture of claim 9 wherein said dopant is present in said mixture within the range of 1 to 20 wt % of said liquid crystal compounds.

13. The mixture of claim 12 wherein said dopant is present in said mixture within the range of 5 to 10 wt %.

* * * * *

UNITED STATES PATENT AND TRADEMARK OFFICE
CERTIFICATE OF CORRECTION

PATENT NO. : 6,495,066 B1
DATED : December 17, 2002
INVENTOR(S) : Shin-Tson Wu

It is certified that error appears in the above-identified patent and that said Letters Patent is hereby corrected as shown below:

Column 1,
Line 24, delete "long term" and replace with -- long-term --.
Line 58, delete "below)." and replace with -- below) --.

Column 2,
Lines 29 and 33, delete "C.;" and replace with -- C; --.
Line 63, delete "a An" and replace with -- a $\Delta$ n --.
Line 65, delete "aminotolane" and replace with -- amino-tolane --.

Column 3,
Line 11, delete "($C_nH_{2-1}$)" and replace with -- ($C_nH_{2+1}$) --.
Line 23, delete "An." and replace with -- $\Delta$ n --.

Column 4,
Line 43, delete "An" and replace with -- $\Delta$ n --.
Line 65, delete "C.," and replace with -- C, --;
Line 65, delete "occurred" and replace with -- occurred --.

Column 5,
Lines 23 and 44, delete "C." and replace with -- C --.
Line 42, delete "C.," and replace with -- C, --;

Column 6,
Line 5, delete "C." and replace with -- C --.

UNITED STATES PATENT AND TRADEMARK OFFICE
CERTIFICATE OF CORRECTION

PATENT NO. : 6,495,066 B1
DATED : December 17, 2002
INVENTOR(S) : Shin-Tson Wu

It is certified that error appears in the above-identified patent and that said Letters Patent is hereby corrected as shown below:

Column 7,
Lines 9 and 57, delete "$_{and}$" and replace with -- and --.

Column 8,
Line 57, delete "$_{and}$" and replace with -- and --.

Signed and Sealed this

Twenty-second Day of July, 2003

JAMES E. ROGAN
*Director of the United States Patent and Trademark Office*